Patented Oct. 27, 1931

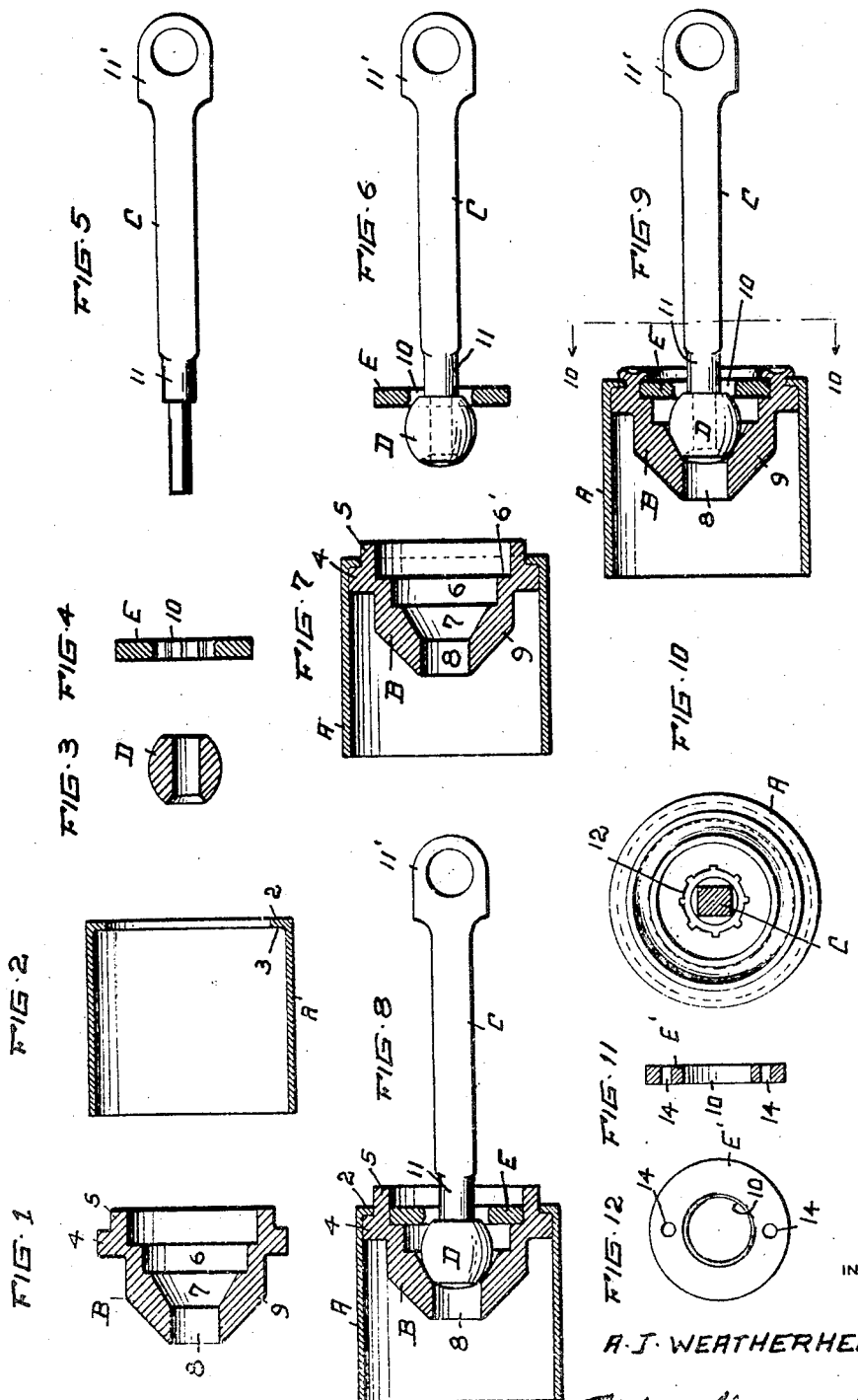

1,829,552

UNITED STATES PATENT OFFICE

ALBERT J. WEATHERHEAD, JR., OF CLEVELAND, OHIO

PISTON AND CONNECTING ROD

Application filed February 13, 1930. Serial No. 428,037.

The present invention relates to an improvement in pistons and connecting rods, and a method of producing, assembling and uniting such parts together. Thus, the object of the invention in general is to provide a sectional piston and a sectional connecting rod, the component parts of which may be produced quickly and cheaply by automatic screw machine and punch press operations and also connected and united together in the expeditious manner and facile way hereinafter described to provide a complete working unit adapted to fit and reciprocate within a cylinder, such as a dash pot cylinder, or the cylinder of an engine, pump or other apparatus using a reciprocable piston and connecting rod.

As an exemplification, I show in the accompanying drawings, one form of the invention which is particularly designed and adapted for use in a dash pot device for carburetors, Fig. 1 representing a sectional view of a separate end wall for a piston, Fig. 2, a sectional view of a cylindrical piston body fashioned to receive said end wall, and Figs. 3 and 4 sectional views of two separate pieces adapted to be nested together within said end wall when secured to a connecting rod for the piston, said connecting rod being shown in elevation in Fig. 5. Fig. 6 is a side elevation and sectional view of the connecting rod and its coupling members assembled, and Fig. 7 is a sectional view of the piston body and its separate end wall assembled. Fig. 8 is a side elevation of the connecting rod parts nested within the piston parts, and Fig. 9 a corresponding view of the same pieces and parts united permanently together. Fig. 10 is an end view of the piston and a cross section of the connecting rod on line 10—10 of Fig. 9. Figs. 11 and 12 are elevations and cross sections, respectively, of a modified form of washer.

As delineated, the complete working unit comprises a cylindrical piston body A, a separate end wall or piston head B for said body, and a connecting rod C coupled loosely to said piston head B by a spherical member or ball D and a ring-shaped disk or washer E.

Piston body A is a thin shell open at both ends and formed with a short inturned flange 2 annularly at one end to provide an internal seat or shoulder 3 therein. Body A may be made of any suitable metal, but in a relatively small dash-pot piston either brass or aluminum is used.

The piston head or end wall B is a separate piece of metal, either aluminum or some other metal, which is ductile or capable of being drawn out or worked. Externally this member B conforms in part to and fits snugly within the flanged end of the piston shell or body A, that is, it has an annular enlargement or flange 4 adapted to abut against the end seat or shoulder 3 in body A, and is also provided with a short cylindrical extension or flange 5 adapted to fit snugly within the open end of body A and to project a short distance beyond the inturned flange 2 on the body. Piston head B is also formed with a circular recess 6 axially thereof which is stepped or counterbored in part to receive ring E and also flared in part or suitably shaped to provide a socket 7 for spherical member D. To foster that purpose head B includes a tapered extension 9 which is adapted to project into the piston body or shell A a substantial distance, and this extension is provided with an axial bore 8 or a suitable communicating passage with recess 6. Bore or passage 8 may be omitted when a closed type of piston is required, but in the present piston the passage or bore 8 is opened and closed alternately during the reciprocable strokes of the piston. That is, during one reciprocable stroke of the piston the ball or spherical member D seats itself within the flaring socket or tapered opening 7 and closes bore 8, and is unseated to open the bore upon the reverse stroke when the piston is shifted in the opposite direction. The limit of outward movement of the sphere is fixed by the ring or ring-shaped washer E, which couples the connection rod C loosely to the piston.

Thus, the disk or washer E has a central opening 10 through which a round portion 11 on the rod C projects, and the ball or sphere D is a perforated body which is sleeved over a reduced and shouldered part 12 on rod C and united to the rod by riveting or upsetting the outer end thereof within a shallow socket in the ball or sphere.

In producing the device, washer E is first sleeved over the reduced end of connecting rod C and then ball D is sleeved upon and riveted in place, see Fig. 6. And, as the central opening in the washer is of smaller diameter than the ball, the washer cannot be separated from the rod, especially when the opposite end 11' thereof is enlarged as shown to permit the same to be coupled to a crank or other operating part.

Having the rod and washer assembly coupled together as described, these parts may be permanently connected to member B and said member united to body A by a very simple and facile operation. Thus, washer A may be introduced into the end recess 6 in member B within which it fits snugly until seated upon the annular shoulder or seat 6' therein. This shoulder or seat is retired inwardly in respect to the end seat on flange 4 on member B and also the inturned flange 2 on body A, so that the outer face of washer E will lie in the same or approximately same plane as the outer end of body A, see Fig. 8. This places washer E inwardly from the end of the cylindrical extension 5 on member B, which projects to a certain extent beyond both pieces, thereby permitting the projected portion to be peened over or upset annularly against both end faces and closing the double joint tightly at their meeting surfaces, see Fig. 9. A union between all three pieces, A, B, and D, may thus be effected by a single upsetting or spinning operation, the thickness of the annular extension 5 being such that sufficient metal may be swaged or spun over in opposite directions in a single operation, or two separate operations, if desired.

All the parts composing the piston proper are now united together and the connecting rod is also coupled to the piston with either a loose play or a swivel fit. And when a fluid passage through the piston is desired, washer E may be constructed to provide constant open communication between recess 6 and the exterior, either by notching or serrating the inner circumferential edge 12' of the washer as shown in Fig 10, or by providing a washer E' having perforations or fluid passages 14 therein.

What I claim, is:

1. A piston, comprising a cylindrical shell, a separate head interlocked with said shell, and a ring-shaped coupling member united with said head.

2. A piston, comprising a shell, a separate head interlocked with said shell, said head having a recess, and a ring interlocked with said head opposite said recess, in combination with a connecting rod extending through said ring into said recess.

3. A piston, comprising a shell and a separate head and coupling ring sleeved together and united together at their meeting surfaces, in combination with a connecting rod having a coupling portion confined between said head and said coupling ring.

4. A piston, comprising a shell, a recessed head adjoining said shell, and a coupling ring for a connecting rod adjoining said recessed head, the stock at the joints between said parts being displaced and uniting said three parts together.

5. A piston, comprising a shell, a separate head seated within said shell and having an annular flange projecting therefrom, a coupling ring for a connecting rod seated against said head adjoining said flange, and said flange being upset into interlocking union with both said shell and ring.

6. A piston, comprising a shell having an inturned flange, a recessed head seated within said shell against said flange, a connecting-rod coupling ring seated within the recess in said head, opposite said flange, and said head having overlapping portions locking said shell and ring to said head.

7. A piston, comprising a shell, a separate head locked to said shell having an end recess and a flaring axial opening, and a ring seated within said end recess and locked to said head, in combination with a connecting rod having a spherical portion confined by said ring within said flarng opening.

8. A piston, comprising a cylindrical shell and a separate head therefor, in combination with a connecting rod having a ring sleeved thereon and a separate spherical member secured thereto, said ring and head being permanently united together.

9. A piston, comprising a cylindrical shell, a recessed head sleeved within said shell having an axial flaring opening, and a ring seated within said recessed head, said head having an annular portion thereof swaged in opposite directions against said shell and ring, in combination with a rod extending through said ring, having a sphercal part seated within said flaring opening and coupling said rod to said ring.

In testimony whereof I affix my signature.

ALBERT J. WEATHERHEAD, JR.